United States Patent [19]
Kattus et al.

[11] Patent Number: 5,315,895
[45] Date of Patent: May 31, 1994

[54] BICYCLE HANDLEBAR CONDUCIVE TO RIDER AERODYANMIC EFFICIENCY

[76] Inventors: Thomas A. Kattus; John B. Rice, both of 2838 Cebu Pl., Carlsbad, Calif. 92009

[21] Appl. No.: 925,816

[22] Filed: Aug. 4, 1992

Related U.S. Application Data

[63] Continuation of Ser. No. 641,910, Mar. 18, 1991, abandoned.

[51] Int. Cl.$^5$ .............................................. B62K 21/12
[52] U.S. Cl. .................................. 74/551.8; 74/551.1; 74/551.9; 280/279
[58] Field of Search ................. 74/551.1, 551.2, 551.3, 74/551.4, 551.5, 551.6, 551.7, 551.8; 403/290, 234, 235, 344; 280/249, 280; 188/24.11

[56] References Cited

U.S. PATENT DOCUMENTS

| | | | |
|---|---|---|---|
| 25,682 | 11/1896 | Sugden | 74/551.8 |
| 718,641 | 1/1903 | Leavitt | 74/551.6 |
| 1,445,995 | 2/1923 | Carlson | 74/551.8 |
| 1,448,921 | 3/1923 | Ershkowitz | 74/551.8 |
| 1,738,855 | 12/1929 | Thompson | 74/551.8 X |
| 3,537,150 | 11/1980 | Emberson | 403/344 |
| 4,250,770 | 2/1981 | Robertson, Jr. | 74/551.8 |
| 4,637,605 | 1/1987 | Ritchie | 74/551.8 |
| 4,723,053 | 2/1988 | Amaya | 403/344 X |
| 4,903,542 | 2/1990 | Borromeo | 74/551.1 |
| 5,163,339 | 11/1992 | Girard, Jr. et al. | 74/551.1 |

*Primary Examiner*—Carl D. Friedman
*Assistant Examiner*—Winnie Yip
*Attorney, Agent, or Firm*—Daniel Robbins

[57] ABSTRACT

A longitudinal bar is mountable on a drop-style bicycle handlebar to provide additional comfortable hand positions conducive to the improvement of the cyclist's aerodyanamic profile. The bar is attached to the drop-style handlebar either in, or above, the substantially horizontal plane defined by the rearwardly extending handgrip section of the drop-style handlebar. The ends of the bar are provided with longitudinally slidable clamps for adjusting the length of the bar in attaching it to the drops or to the handgrips of the drop-style handlebar.

2 Claims, 3 Drawing Sheets

BICYCLE HANDLEBAR CONDUCIVE TO RIDER AERODYANMIC EFFICIENCY

This application is a continuation of application Ser. No. 641,910, filed Mar. 18, 1991 now abandoned.

BACKGROUND OF THE INVENTION

1. Field of the Invention

This invention relates to an auxiliary attachment for a bicycle drop-style handlebar, and in particular to an auxiliary bar conducive to the cyclist's comfortable improvement of his aerodynamic profile.

2. Description Relative to the Prior Art

Cycling has been developing from a casual, relaxed pastime into a highly sophisticated, high technology sport. Modern racing bicycles are engineered for light weight, structural strength and mechanical efficiency. Additionally, the position of the cyclist on the bicycle, as well as his posture is of extreme importance in determining the aerodynamic drag experienced while cycling at high speed.

The steering mechanism universally used on today's racing bicycles is the drop-style handlebar. The drop-style handlebar consists of a crossbar terminating in two downwardly extending branches, (known as "drops"), which then transition into two rearwardly extending handgrips. Referring to FIG. 1, in the prior art a cyclist 10 mounted on a bicycle 12 utilizing a drop-style handlebar 14, positions his hands on the readwardly extending hand grips 16,18. In this position, the cyclist 10 has a limited degree of control of the area that his forward facing body elements present to the on-coming mass of air. While the cyclist 10 can bend forward, thereby lowering his head position and reducing his forward facing aerodynamic profile to a certain extent, the position of his hands on the outwardly located hand grips 16,18 does not provide control over the lateral aspect of his forward facing profile. It is to the further reduction of the aerodynamic area presented by the cyclist's body, and the attendant reduction of aerodynamic drag, that the teaching of the present invention is directed.

SUMMARY OF THE INVENTION

Rather than the cyclist's hands positions being essentially limited to the handgrip positions of a drop-style handlebar as known in the prior art, the practice of the present invention allows the cyclist to place his hands in a range of positions which are conducive to the comfortable adjustment of his forward facing aerodynamic profile, in the manner described below.

A longitudinal bar is mountable on a drop-style bicycle handlebar to provide additional hand positions. The invention teaches attachment of the bar to the drop-style handlebar either in, or above, the substantially horizontal plane defined by the rearwardly extending handgrip section of the drop-style handlebar. The ends of the bar are provided with longitudinally slidable clamps for adjusting the length of the bar in attaching it to the drops or to the handgrips of the drop-style handlebar.

Referring to FIG. 2, the bicycle 12 having a drop-style handlebar 14 is provided with a bar 20 in accordance with the present invention. The cyclist 10 may place his hands 22,24 anywhere along the bar 20. This allows the cyclist 10 not only to decrease his forward facing aerodynamic profile by lowering his head, but also to comfortably contract his shoulders 26,28 to reduce the cross-sectional chest area 30 presented to the on-coming atmosphere. Comparing the reduced cross-sectional chest area 30 attainable by means of practice of the invention to the corresponding area 30' attainable in the prior art (FIG. 1), the decrease of air resistance area presented by the cyclist's body with the attendant increase of aerodynamic efficiency may be appreciated.

BRIEF DESCRIPTION OF THE DRAWINGS

The prior art and the invention may be understood by reference to the drawings, of which.

DESCRIPTION OF THE PREFERRED EMBODIMENT

Figure 1:
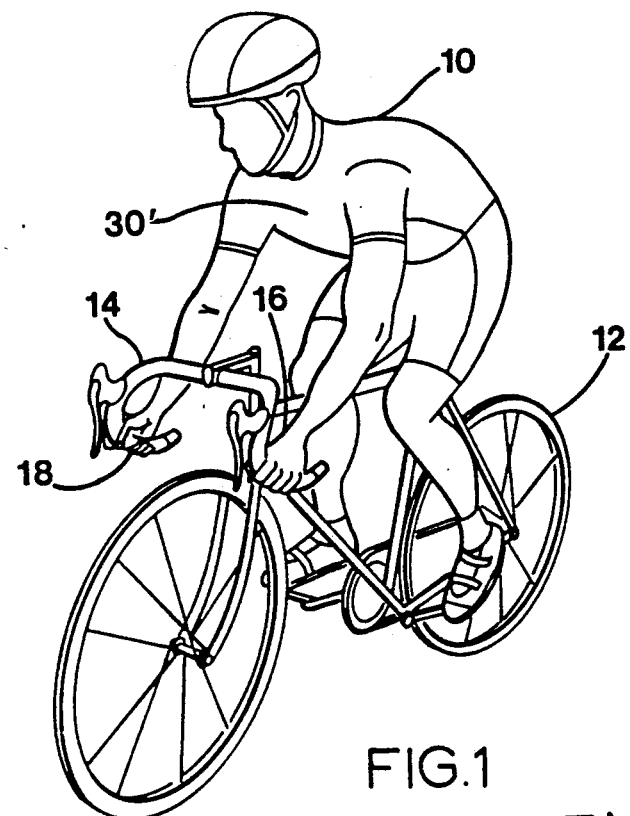
FIG. 1 is a drawing of a cyclist on a bicycle having the drop-style handlebar known in the art.
Figure 2:
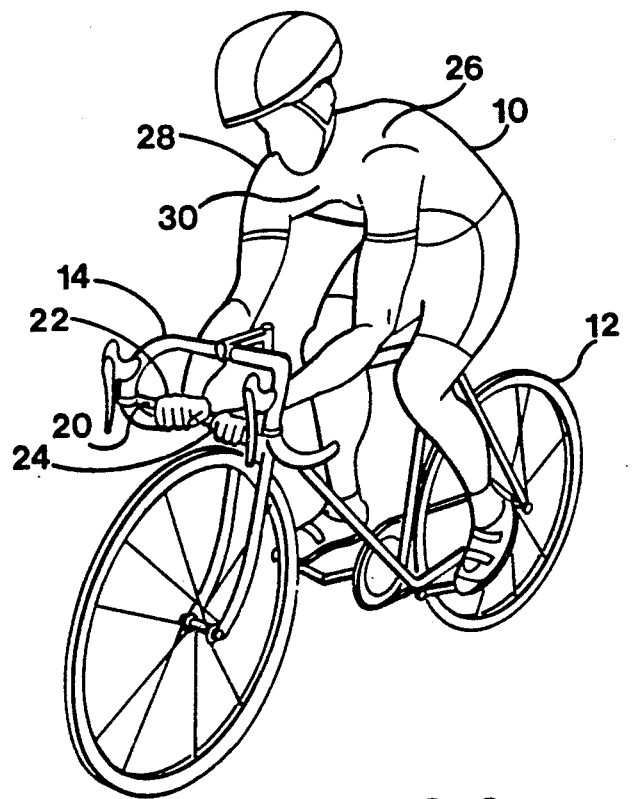
FIG. 2 is a drawing of a cyclist on a bicycle having the bar of the invention attached to the drop-style handlebar.
Figure 3:
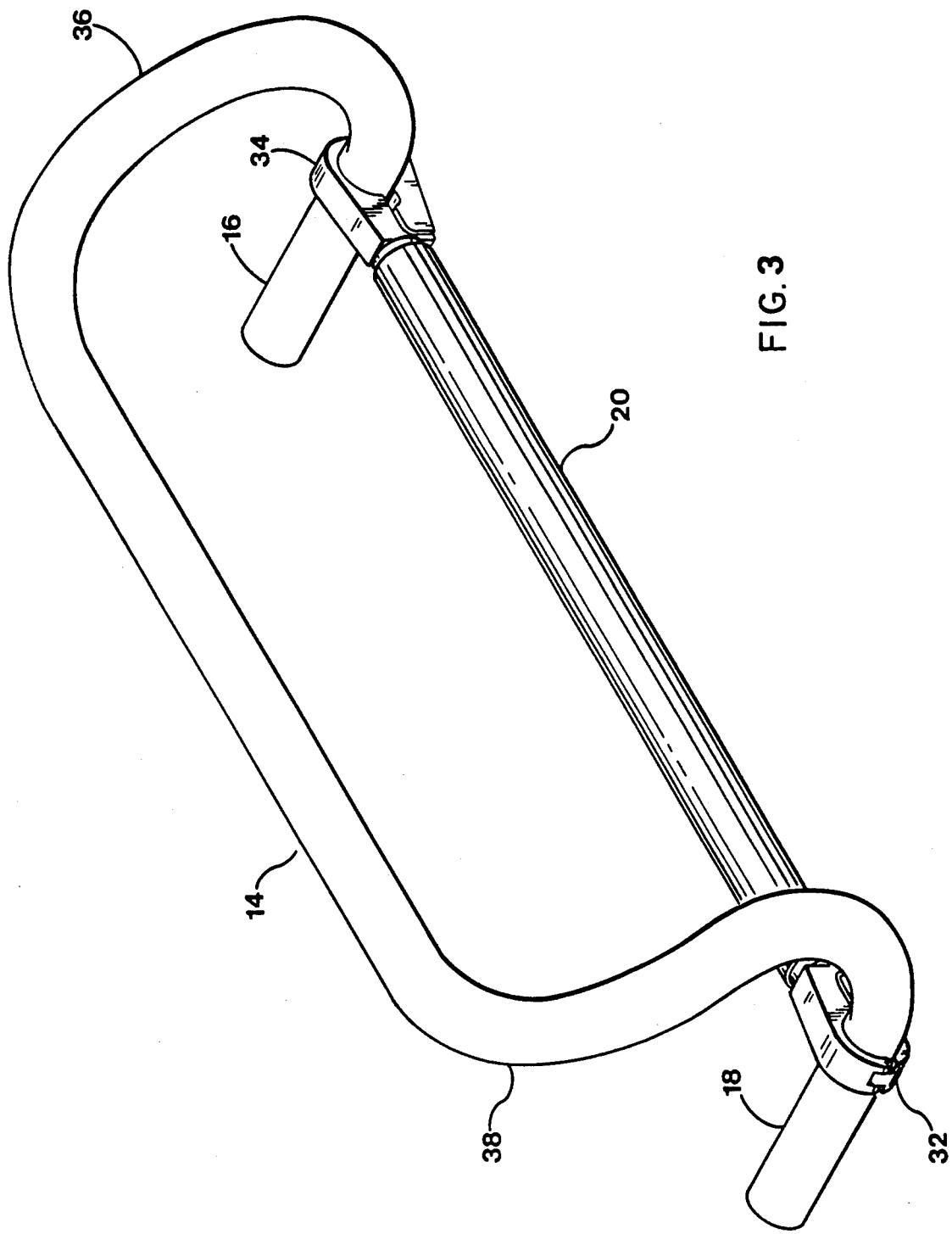
FIG. 3 is a drawing of a drop-style handlebar with the bar of the invention mounted thereon.

Referring to FIG. 3, a drop-style handlebar 14 has the bar 20 of the invention mounted on the drop-style handlebar 14 handgrips 16,18 by means of clamps 32,34. The bar 20 may alternately be mounted on the lower portions of the drops 36,38, the upper portions of the drops 36,38 being reserved for mounting the bicycle's brake levers (not shown). The choice of mounting the bar 20 either on the handgrips 16,18 or the drops 36,38 provides flexibility in tailoring the bar 20 position to the cyclist's maximum comfort and control of his aerodynamic profile.

Figure 4:
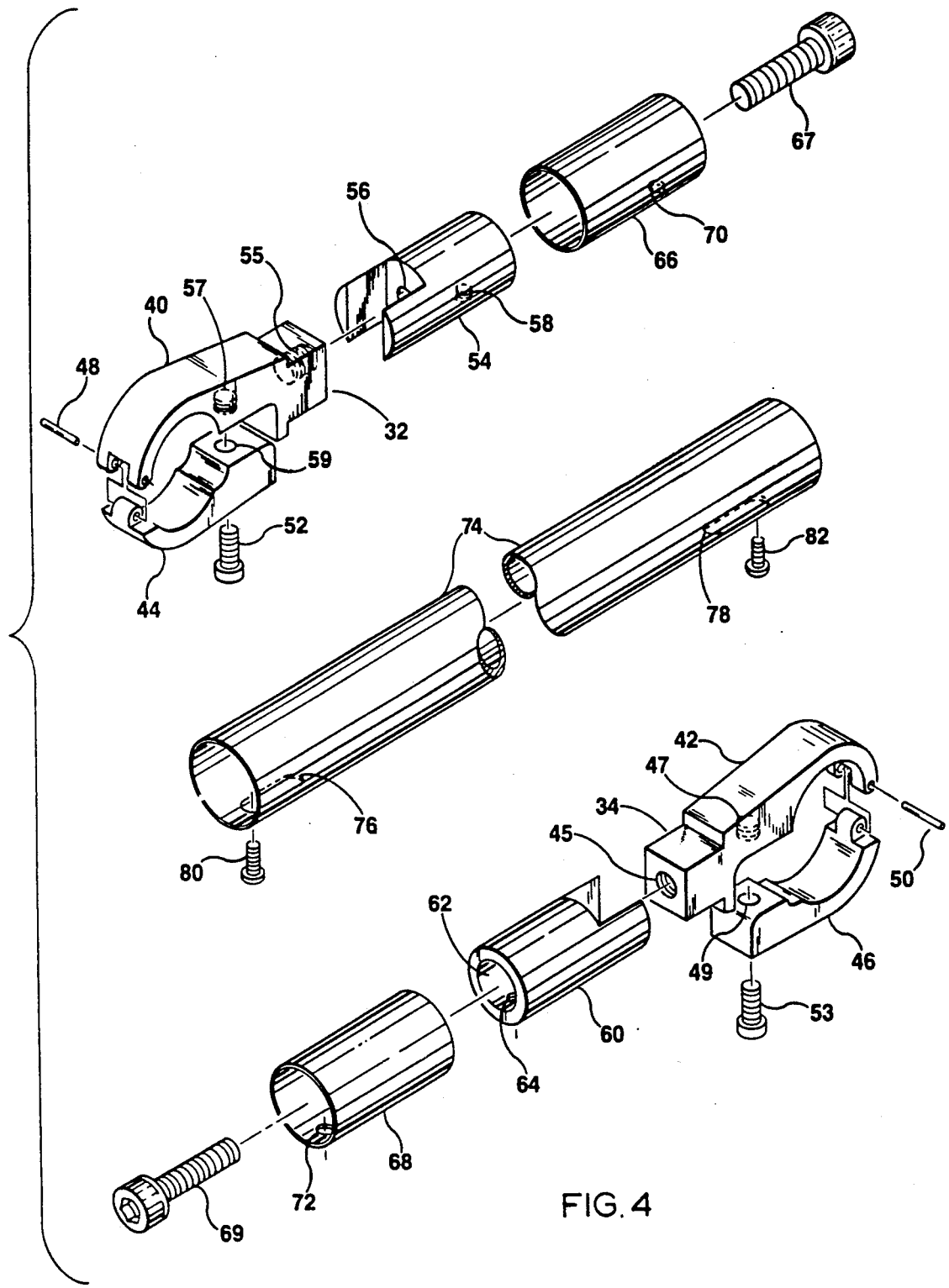
FIG. 4 is a drawing showing an exploded view of the component parts of the bar of the invention.

Referring to FIG. 4, a clamp 32 has an upper jaw 40 pivotally connected by means of a pin 48 to a lower jaw 44. The upper jaw 40 is provided with tapped holes 55,57 and the lower jaw 44 has a clearance hole 59. At the other end of the bar 20 is an identical clamp 34 having an upper jaw 42, and lower jaw 46 pivotally connected by a pin 50. The upper jaw 42 is provided with tapped holes 45,47 and clearance hole 49. The clamp 32 attaches one end of the bar 20 to a drop-style handlebar 14 by means of a screw 52 which joins the upper jaw 40 to the lower jaw 42 clamping the drop-style handlebar 14 between the jaws 40,44. Similarly, the clamp 34 has a screw 53 passing through the clearance hole 49 of the lower jaw 46 to mate with the hole 47 of the upper jaw 42 for securing the jaws 42,46 to the drop-style handlebar 14. An intermediate key 54 has a bored through hole 56 and a tapped hole 58. A corresponding intermediate key 60 has a bored through hole 62 and a tapped hole 64. Retaining bolts 67, 69 secure the intermediate keys 54,60 to the upper clamps 32,42 respectively. Intermediate sleeves 66, 68 slip over the intermediate keys 54,60 respectively, and have clearance holes 70,72 which are aligned with the tapped holes 58,64 respectively. A tube 74 having slots 76,78 slips over the intermediate sleeves 66,68 and retaining screws 80,82 passing through the slots 76,78, clear the holes 70,72 of the intermediate sleeves 66,68 and mate with the tapped holes 58,64 of the intermediate keys 54,60. In mounting the bar 20 on a drop-style handlebar 14, the slip fit of the tube 74 over the intermediate sleeves 66,68 allows the adjustable fitting of the bar 20 to all widths of drop-style handlebars 14, and the bar is then locked into position by tightening of the retaining screws 80,82.

The clamps 40,42, and intermediate keys 54,60 are machined from extruded aluminum, and the sleeves 66,68 and tube 74 are aluminum tubing.

We claim:

1. A bicycle steering mechanism comprising:
    a) a drop-style handlebar having a crossbar with first and second downwardly curving sections perpendicular to said crossbar, said curving sections transitioning into first and second rearwardly curving handgrip portions with said handgrip portions lying in a common plane,
    b) a rigid substantially straight cylindrical bar having a first end and a second end, said bar being attached to said drop-style handlebar, and
    c) first clamp means comprising a first lower jaw assembly pivotally joined to a first upper jaw assembly slideably joined to said first end of said bar for clamping said first end of said bar to said drop-style handlebar, second clamp means comprising a second lower jaw assembly pivotally joined to a second upper jaw assembly slideably joined t said second end of said bar for clamping said second end of said bar to said drop-style handlebar, wherein said straight cylindrical bar is adjustably positioned on said rearwardly curving handgrip portions to lie in said plane defined by said first and said second rearwardly curving handlebar handgrip portions of said drop-style handlebar, said bar being so constructed, and arranged on said handlebar that a rider of said bicycle has available a range of comfortable hand portions on said bar conducive to decreasing said rider's aerodynamic profile.

2. A bicycle steering mechanism comprising:
    a) a drop-style handlebar having a crossbar with first and second downwardly curving sections perpendicular to said crossbar, said curving sections transitioning into first and second rearwardly curving handgrip portions with said handgrip portions lying in a common plane,
    b) a rigid substantially straight cylindrical bar having a first end and a second end, said bar being attached to said drop-style handlebar, and
    c) first clamp means comprising a first lower jaw assembly pivotally joined to a first upper jaw assembly slideably joined to said first end of said bar for clamping said first end of said bar to said drop-style handlebar, second clamp means comprising a second lower jaw assembly pivotally joined to a second upper jaw assembly slideably joined dot said second end of said bar for clamping said second end of said bar to said drop-style handlebar, wherein said straight cylindrical bar is adjustably positioned on said downwardly curving portions to lie above said plane defined by said first and said second rearwardly curving handlebar handgrip portions of said drop-style handlebar, said bar being so constructed, and arranged on said handlebar that a rider of said bicycle has available a range of comfortable hand portions on said bar conducive to decreasing said rider's aerodynamic profile.

* * * * *